US010026249B2

(12) United States Patent
GrandPre et al.

(10) Patent No.: US 10,026,249 B2
(45) Date of Patent: Jul. 17, 2018

(54) BI-DIRECTIONAL ACCESS CONTROL SYSTEM

(71) Applicant: Schlage Lock Company LLC, Carmel, IN (US)

(72) Inventors: Patrick GrandPre, Carmel, IN (US); Joseph W. Baumgarte, Carmel, IN (US)

(73) Assignee: Schlage Lock Company LLC, Carmel, IN (US)

( * ) Notice: Subject to any disclaimer, the term of this patent is extended or adjusted under 35 U.S.C. 154(b) by 0 days.

(21) Appl. No.: 15/487,777

(22) Filed: Apr. 14, 2017

(65) Prior Publication Data

US 2017/0301165 A1 Oct. 19, 2017

Related U.S. Application Data

(60) Provisional application No. 62/322,496, filed on Apr. 14, 2016.

(51) Int. Cl.
*G06F 7/04* (2006.01)
*G07C 9/00* (2006.01)

(52) U.S. Cl.
CPC ..... *G07C 9/00309* (2013.01); *G07C 9/00571* (2013.01); *G07C 2009/00357* (2013.01); *G07C 2009/00769* (2013.01); *G07C 2009/00793* (2013.01)

(58) Field of Classification Search
CPC .................. G07C 9/00309; G07C 2009/00642
USPC .................................... 340/5.2, 5.5, 5.7, 5.8
See application file for complete search history.

(56) References Cited

U.S. PATENT DOCUMENTS

| | | | | |
|---|---|---|---|---|
| 2010/0283579 | A1 | 11/2010 | Kraus et al. | |
| 2014/0035722 | A1 | 2/2014 | Kincaid et al. | |
| 2014/0049365 | A1 | 2/2014 | Ahearn et al. | |
| 2016/0142477 | A1* | 5/2016 | Kawazoe ............ | H04L 67/1025 709/203 |

(Continued)

OTHER PUBLICATIONS

Alarm Lock: Trilogy Networx Interfaces: Ethernet and 802.11B/G specs brochure, dated Oct. 2009 (2 pages).

(Continued)

*Primary Examiner* — Carlos E Garcia
(74) *Attorney, Agent, or Firm* — Taft Stettinius & Hollister LLP

(57) ABSTRACT

Systems and apparatuses for real time, bi-directional communications between an access control management host and one or more access control devices. The access control devices can be structured to make certain decisions at the access control device and communicate, in real time, information to, as well as receive in real time information from, the access control management host via a networked gateway. The access control device and networked gateway can communicate via a first wireless protocol that at least assists in minimizing the energy of an electrical energy source, such as, for example, a battery, that is coupled to the access control device. Examples of the first wireless protocol can include low latency, low-power wireless technologies or protocols. The networked gateway can communicate with the access control management host using a second protocol via a wired or wireless connection.

30 Claims, 1 Drawing Sheet

(56) References Cited

U.S. PATENT DOCUMENTS

| | | | | |
|---|---|---|---|---|
| 2017/0011573 | A1* | 1/2017 | Belhadia | E05B 47/0615 |
| 2017/0053467 | A1* | 2/2017 | Meganck | G07C 9/00039 |

OTHER PUBLICATIONS

Assa Abloy: AH30 1-to-8 Standard Aperio™ RS485 communication hub, dated Sep. 23, 2013 (1 page).
Kaba Access Control: Wireless Access Control Goes "Plug and Play", press release dated Apr. 26, 2012 (1 page).
Lenel: ILS Wireless Gateway brochure, date unknown (2 pages).
Salto: ClayIQ, date unknown (1 page).
Salto: Wireless XS4 RFID product brochure, dated Sep. 2009 (60 pages).
Stanley: EL Series Electronic Lock specification, dated 2013 (1 page).
Stanley: WI-Q™ Technology brochure, dated 2008 (12 pages).

* cited by examiner

BI-DIRECTIONAL ACCESS CONTROL SYSTEM

CROSS REFERENCE TO RELATED APPLICATIONS

The present application claims the benefit of U.S. Provisional Patent Application Ser. No. 62/322,496 filed Apr. 14, 2016, the contents of which are incorporated herein by reference in their entirety.

BACKGROUND

Embodiments of the present application generally relate to real time, bi-directional communication access control systems. More particularly, but not exclusively, embodiments of the present application relate to bi-directional communication access control systems having intelligent access control devices or points that are capable of making local access control decisions.

Often, real time access control devices, such as, for example, electronic locks, that utilize wireless communication are battery powered. However, at least in an attempt to extend battery life and/or otherwise conserve electrical energy of the electrical power sources of the access control devices, real time communications involving such access control devices are often generally limited to a single direction using a master-slave topology. In such situations, in at least an attempt to accommodate power consumption characteristics of the employed wireless protocol, a master device, such as an access control panel, may initiate wireless contact with a slave device, such as an access control device, when the master device has a message to deliver to the slave device. However, if the slave device has a message to deliver to the master device, the slave device typically has to wait until the master device initiates contact with the slave device before the message can be delivered from the slave device to the master device.

Compared to at least certain access control devices that are generally powered via a hard wired connection, such as, for example, a hard-wired connection to a utility power source, wireless, battery powered access control devices that utilize master-slave topology can have relatively limited and/or impaired end-user applications. For example, certain end-users may generally have a preference for low-latency of communication up to the access control device to the host system, which can, in at least certain situations, be associated with experiencing relatively dramatically slower timing when the host system wants to push a message down to the access control device. Efforts to address such issues have included the use of access control devices having real time, bi-directional capabilities. Yet, as previously mentioned, power consumption constraints and/or associated energy conservation typically mandates that such access control devices be hard wired to a power source. Further, hard wired access control devices, and the associated constraints, such as, for example, the need for hard wiring to a utility power source, has certain drawbacks and limitations that are not associated with the use of battery powered access control devices, including, for example, the costs of installing and maintaining the wire used to deliver electrical power to the access control devices.

Additionally, wireless and wired access control devices often utilize a central point, such as, for example, an access control panel (ACP), to make an access control decision in real time. However, in at least an attempt to ensure all access control requests are processed in a timely fashion, use of an ACP for making decisions for access control devices can result in the communication channels linking the ACP to the access control device being dedicated for the purpose of access control and/or having to satisfy relatively stringent or enhanced capacities for reliability. Further, attaining such extra capabilities of the networking medium can increase the cost for access control. For example, if wireless communication methods are used, channels or frequencies used to provide communication channels linking the access control devices to the ACP may be selected based on the ability to attain a particular level of performance that can reliably support such the associated demands. Often, reliably attaining such performance entails the selection and use of certain custom or regulated wireless technologies. Further, at least in the case of use of certain regulated wireless technologies, sales of the access control devices and/or of at least certain components of the system are generally limited to the certain geographic jurisdictions that certify that particular regulated wireless technology. Conversely, rather than utilizing custom or regulated wireless technologies, if a global wireless standard is used, such as, for example, Wi-Fi, often dedicated networks or channels may be incorporated into the system to attain the access control reliability and/or performance criteria, which can place a relatively large burden of ownership on the end-users.

Additionally, power outages can be a relatively prevalent issue for centralized access control decision making. For example, for access control devices that rely on an ACP to make decisions in real time, the loss of communication with the ACP can result in a degraded mode of operation. Thus, in at least an attempt to deal with such issues, some systems may install back-up batteries and/or generators that can provide power during utility power outages so as to allow access control to continue through the ACP. Yet, besides adding to the costs associated with the system, for at least certain battery powered access devices, even after resuming communication with the ACP, the history of events that occurred during the loss of communication are typically lost and non-retrievable.

Additionally, wireless access control devices that are capable of making access control decisions at the door typically require touring with an update tool to update the local access control database. Alternatively, such wireless access control devices can rely upon periodic or pre-negotiated times in which the access control device is to communicate with the ACP. Yet, such procedures can be both timely and costly, and result in delays in updates for the system and/or devices of the system.

BRIEF SUMMARY

In one aspect of the present application, a system is provided that includes an access control device, a networked gateway, and an access control management host. The access control device can include at least one wireless transceiver and a memory for storing information relating to the operation of the access control device. The access control device can further include a processing device that is coupled to the memory, the processing device being structured to make a decision relating to the operation of the access control device based at least in part on information stored in the memory. Further, the access control device is structured to communicate, in real time, with the networked gateway using a first wireless protocol, the first wireless protocol comprising a low latency, low-power wireless technology or protocol. The networked gateway can communicate with the access control management host using a second protocol such that real time, bi-directional communications can be exchanged between the access control management host and the access control host via the networked gateway.

BRIEF DESCRIPTION OF THE DRAWINGS

The description herein makes reference to the accompanying figures wherein like reference numerals refer to like parts throughout the several views.

Figure 1:
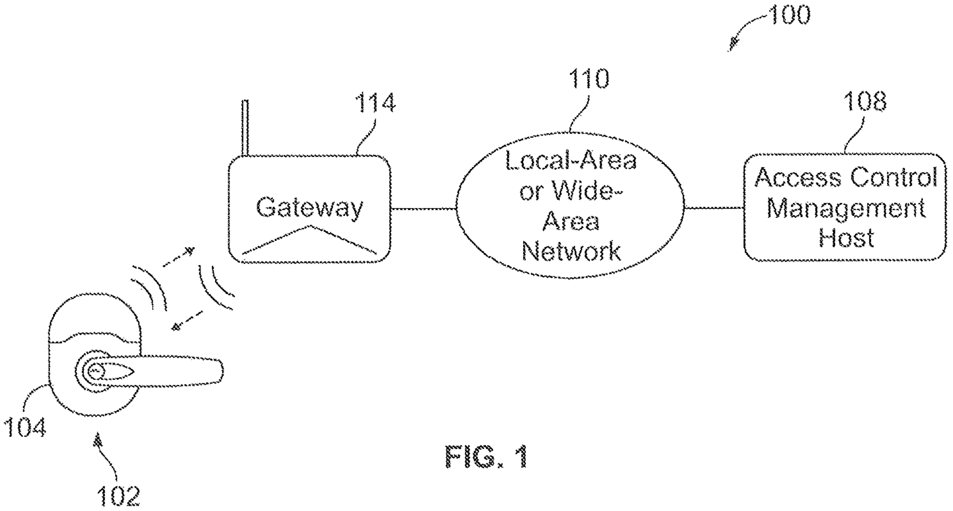
FIG. 1 illustrates a schematic view of an exemplary security management system.

The foregoing summary, as well as the following detailed description of certain embodiments of the present invention, will be better understood when read in conjunction with the appended drawings. For the purpose of illustrating the invention, there is shown in the drawings, certain embodiments. It should be understood, however, that the present invention is not limited to the arrangements and instrumentalities shown in the attached drawings. Further, like numbers in the respective figures indicate like or comparable parts.

DESCRIPTION OF THE ILLUSTRATED EMBODIMENTS

Certain terminology is used in the foregoing description for convenience and is not intended to be limiting. Words such as "upper," "lower," "top," "bottom," "first," and "second" designate directions in the drawings to which reference is made. This terminology includes the words specifically noted above, derivatives thereof, and words of similar import. Additionally, the words "a" and "one" are defined as including one or more of the referenced item unless specifically noted. The phrase "at least one of" followed by a list of two or more items, such as "A, B or C," means any individual one of A, B or C, as well as any combination thereof.

FIG. 1 illustrates a schematic view of an exemplary security management system 100. As illustrated, the security management system 100 includes one or more access control devices 102, a network gateway 114, and an access control management host 108. FIG. 1 illustrates an access control management host 108 that wirelessly communicates with an access control device 102 via use of a networked gateway. Further, according to the embodiment depicted in FIG. 1, the access control management host 108 can utilize a local area network (LAN) or wide-area network (WAN) 110 (e.g., internet) to wirelessly communicate with the networked gateway 114. Alternatively, according to other embodiments, rather than using a wireless connection, the access control management host 108 and networked gateway 114 can be communicatively coupled via a wired or Ethernet connection. Further, while FIG. 1 depicts the use of a LAN or WAN connection, the access control management host 108 and the gateway 114 can communicate to each other, as well as communicate with other components of the system 100, in a variety of other manners, including, for example, via a cellular data network and/or a combination of a LAN, WAN, and/or cellular data network, among other manners or forms of communication.

A variety of different types and/or combinations of devices can be utilized for the access control device(s) 102, including, for example, lockset devices 104, door closers, and reader devices, and/or a combination thereof. The number and types of access control devices 102 can vary for different security management systems 100. For example, according to certain embodiments, the security management system 100 can also include, in addition to, or in lieu of, other access control devices 102, one or more exit devices and/or payment terminals, among other access control devices 102.

At least some types of access control devices 102 can be involved with controlling, managing, and/or facilitating the displacement, including authorization to displace, an entryway device, such as, for example, a door, gate and/or moveable wall, among other devices, from a closed position to an open position, and/or from an open position to the closed position, and thereby at least assist in controlling ingress/egress through the associated entryway(s). For example, according to certain embodiments, at least one access control device 102 may be an lockset device 104, such as, but not limited to, an electronic lock device, that includes a lock mechanism 106 (FIG. 2) that may include, for, example, a displaceable bolt and/or a latch, that is displaceable between locked and unlocked positions to selectively lockingly engage the adjacent door frame, wall, and/or mating components that are coupled or mounted to/in the adjacent door frame and/or wall. Similarly, according to other embodiments, the access control devices 102 may include an exit device having a push bar or push pad that is coupled to a lock mechanism 106 that includes a latch assembly. According to such an embodiment, the operable displacement of the push bar or pad can facilitate the displacement of a latch of the latch assembly from an extended, locked position to a retracted, unlocked position.

A reader device may, or may not, be incorporated into another access control device 102, or may be a separate unit that may be in communication with one or more components of the security management system 100, including, but not limited to, another access control device 102, such as, for example, an electronic lockset device 104 and/or a network gateway 114, among other devices. Further, the reader device can be structured to receive or detect identification information in connection with a determination of whether displacement of the entryway device and/or ingress/egress through the associated entryway generally is, or is not, authorized.

According to certain embodiments, the access control device 102 includes, or is operably connected to, a reader device in the form of a credential reader that can retrieve and/or detect credential information on or from a credential device, such as, for example, a credential on a card or badge, among other credential devices. For example, certain reader devices may include a credential reading interface structured to read at least one type of credential, including, but not limited to, a prox and/or NFC (i.e., smart card). However, the reader device may receive identification information in a variety of other manners, including, for example, through the use of a fingerprint or retinal scan, keypad entry, and/or wireless communication. The identification information provided to, or retrieved by, the reader device may be evaluated by the reader device or another device of the security management system 100 in connection with determining whether the credential and/or associated user has permission or authorization to operate components of the security management system 100, such as, for example, to unlock a lock mechanism of an associated access control device 102 and/or to displace an entryway device.

Figure 2:
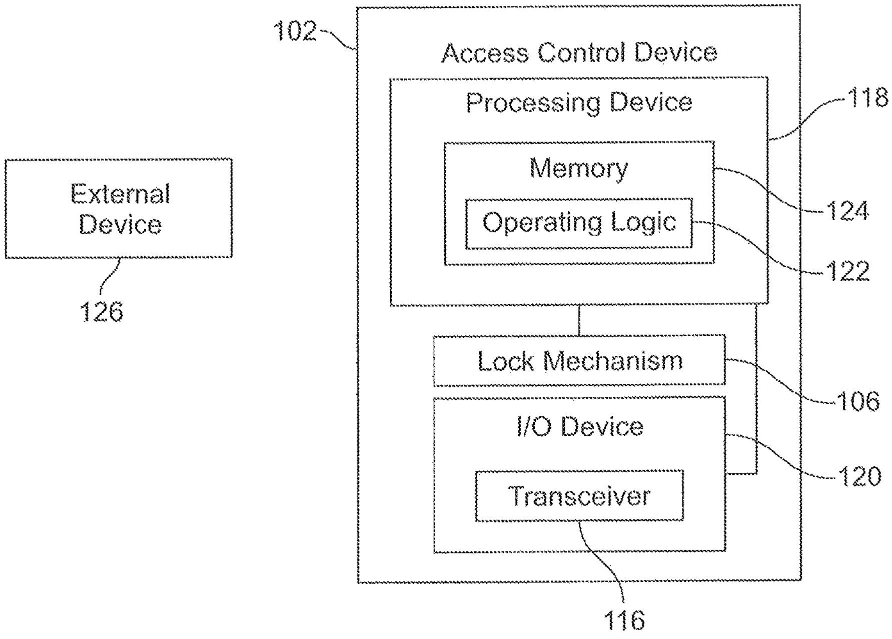
FIG. 2 illustrates a schematic of an exemplary access control device and an external device.

FIG. 2 illustrates a schematic of an exemplary access control device 102. As illustrated, the access control device 102 can include a processing device 118, an input/output device 120, operating logic 122, and a memory 124 that may or may not be part of the processing device 118. The input/output device 120 can allow the access control device 102 to communicate with one or more external devices 124, which may be any type of device that allows data to be inputted or outputted from the access control device 102. For example, according to certain embodiments, the external device 126 may include the access control management host 108, network gateway 114, mobile electronic device, and/or other access control devices 102 of the security management system 100. Additionally, according to certain embodiments, the external device 126 may be, for example, a switch, a router, a firewall, a server, a database, a networking device, a controller, a computer, a processing system, a printer, a display, an alarm, an illuminated indicator such as a status indicator, a keyboard, a mouse, or a touch screen display. Additionally, according to certain embodiments, the external device 126 may be integrated into the access control device 102. It is further contemplated that there may be more than one external device 102 in communication with the access control device 102.

According to certain embodiments, the input/output device 120 includes one or more transceivers 116, a network adapter, a network card, an interface, and/or a port, such as, for example, a USB port, serial port, parallel port, an analog port, a digital port, VGA, DVI, HDMI, FireWire, CAT 5, or any other type of port or interface. Further, the input/output device 120 can include hardware, software, and/or firmware. Additionally, it is contemplated that the input/output device 120 can include more than one of these adapters, cards, or ports. Additionally, according to certain embodiments, the input/output device 120 may also be structured to communicate with the access control management host 108 via the networked gateway 114, as discussed below in more detail.

The processing device 118 of the access control device 102 can be a programmable type, a dedicated, hardwired state machine, or any combination of these. The processing device 118 may further include multiple processors, Arithmetic-Logic Units (ALUs), Central. Processing Units (CPUs), Digital Signal Processors (DSPs), or the like. Processing devices 118 with multiple processing units may utilize distributed, pipelined, and/or parallel processing. The processing device 118 may be dedicated to performance of just the operations described herein or may be utilized in one or more additional applications. In the depicted form, processing device 118 is of a programmable variety that executes algorithms and processes data in accordance with operating logic 122 as defined by programming instructions (such as software or firmware) stored in memory 124. Alternatively, or additionally, the operating logic 122 for the processing device 118 is at least partially defined by hardwired logic or other hardware. The processing device 118 may include one or more components of any type suitable to process the signals received from input/output device 120 or elsewhere, and to provide desired output signals. Such components may include digital circuitry, analog circuitry, or a combination of both.

The memory 124 may be of one or more types, such as a solid-state variety, electromagnetic variety, optical variety, or a combination of these forms. Further, the memory 124 can be volatile, nonvolatile, or a combination of these types, and some or all of the memory 124 can be of a portable variety, such as a disk, tape, memory stick, cartridge, or the like. In addition, the memory 124 can store data that is manipulated by the operating logic 122 of the processing device 118, such as data representative of signals received from and/or sent to the input/output device 120 in addition to or in lieu of storing programming instructions defining the operating logic 122, just to name one example. As shown in FIG. 2, the memory 124 may be included with the processing device 118 and/or coupled to the processing device 118.

The access control device 102 is reconfigurable so that an administrator can, such as, for example, by use of the access control management host 114, configure or otherwise program the access control device 102 to operate in a plurality of modes of communication. For example, the access control device 102 can be programmed via a connection with the access control management host 108 via use of the networked gateway 114.

Additionally, according to certain embodiments, the access control device 102 can be configured to make certain decisions at the access control device 102. Moreover, according to certain embodiments, the access control device 102 can be configured to make certain decisions at the access control device 102 without seeking confirmation and/or permission from the access control management host 108. For example, according to certain embodiments, the access control management host 108 can include in its memory 124 a user access database that can be used in connection with a determination of the access control device 102 of whether credentials or other provided/detected information indicates authorization to operate the access control device 102 and/or authorization to change a status of the access control device 102 in manner that can result in gaining ingress/egress through an associated passageway.

According to certain embodiments, the access control management host 108 may, via the gateway 114, communicate to/with the access control device 102 using a relatively low latency, low-power wireless technology or protocol, as discussed below. Further, such connections between the access control device 102 and the access control management host 108 may be in real time. Additionally, at least certain communications between the access control device 102 and the access control management host 108 may be a pre-scheduled occurrence(s), or may be triggered by the occurrence of a particular event or command. By being periodic, programming or otherwise programming the access control device 102 via the third mode may at least attempt to minimize the energy consumed during the transfer of information and/or the associated communication(s) and/or programming. For example, according to certain embodiments, the access control device 102 may wake-up on a periodic schedule to download updated information from the access control management host 108, including information relating to authorization of credentials and/or users to operate components of the security management system 100, among other information. Additionally, according to certain embodiments, the access control device 102 may initiate communications, in real time, with the access control management host 108, such as, for example, upon the occurrence of a certain event, such as, for example, when the access control device 102 has a message, request, status update, and/or other updated information for the access control management host 108, and/or when the access control device 102 seeks to retrieve or gain access to information retained by, or accessible to, the access control management host 108.

The access control management host 108 can be used to control and/or manage the operations of the security management system 100. Moreover, according to certain embodiments, the access control management host 108 can be configured for a variety of tasks related to the installation, management, and/or operation of the security management system 100 and/or components of the management system 100, including, for example, the access control device(s)

102, and/or one or more servers of the system 100. According to certain embodiments, the access control management host 108 may comprise, for example, an access control panel and/or server, or a combination thereof. Alternatively, the access control management host 108 may be communicatively coupled to one or more servers, such as, but not limited to, a cloud based server, among other types of servers.

According to certain embodiments, the access control management host 108 includes non-transitory computer executable instructions to perform various operations in the form of one or more applications. Further, the access control management host 108 can include a memory and/or a processor sufficient in size and operation to store and manipulate a database and one or more applications for communicating with the other access control devices 102 of the security management system 100. Additionally, the access control management host 108 may, or may not, be located at the same location or a remote location relative to one or more of the access control devices 102.

According to certain embodiments, the access control management host 108 may store, or have access to, a variety of different information, including, for example, user lists and access logs. Additionally, according to certain embodiments, the access control management host 108 may store, or have access to, information relating to one or more access control devices 102 of the system 100, such as, for example, access permissions for each access control device 102 corresponding to each user in the user list(s), a location, status, and/or type identifier(s) for each access control device 102, and/or any other information for the system 100. Alternatively, or in addition to, the access control management host 108 storing some or all of such information, among other information, the access control management host 108 may retrieve such information from one or more servers, including, for example, a cloud based server, among other servers.

According to certain uses, a company, facility, or entity may utilize the access control management host 108 to manage and oversee the operations of the security management system 100, including, for example, establishing authorization of certain credentials and/or users, establishing times for access control devices 102 to seek updates, setting parameters regarding time periods during which entryway devices may be displaced from their respective closed position, and/or monitoring and analyzing information pertaining to the usage of components of the security management system 100. Further, according to certain embodiments, the access control management host 108 can include functionality to program one or more of the access control devices 102, verify access permissions received from the credential devices at each reader device, determine a communication protocol or mode that is to be used to communicate information to devices of the security management system 100, issue commands for the access control device 102 to establish a direct or indirect connection to the access control management host 108, updating user lists, access permissions, and/or adding/removing access control devices 102 to/from the system 100, among other operations.

One or more components of the security management system 100, such as, for example, the access control device(s) 102, can be structured to communicate with one or more mobile or portable electronic devices 112 such as, for example, personal electronic devices, including, but not limited to, a smartphone and a tablet computer, and the like. The mobile electronic device 112 may be in communication with one or more of the access control devices 102 in a variety of different manners, including, for example, via a wireless communication protocol such as WI-FI and/or Bluetooth Low Energy (BLE). The access control device 102 may send to the mobile electronic device 112 a variety of different types of information, such as, for example, device identification information, diagnostic results, usage data, and the like, among other types of information. Additionally, according to certain embodiments, the mobile electronic device 112 may communicate with the access control management host 108. For example, the mobile electronic device 112 may send a variety of different types of information to the access control management host 108, such as, for example, identification information relating to the owner of the mobile electronic device 112, information identifying the access control device(s) 102 to which the mobile electronic device 112 is communicating, or attempting to communicate with, firmware updates, information regarding activation or deactivation of components or access control devices 102, and/or information retrieved from the access control device 102, among other information.

According to certain embodiments, the networked gateway 114 can be used to establish bi-directional communications between the access control management host 108 and one or more of the access control devices 102. For example, the networked gateway 114 can communicate with the access control management host 108 through an existing IP network or system of IP networks. Moreover, the networked gateway 114 can be adapted to gain network access via a standard wired connection, such as, for example, via an Ethernet connection, or through the use of an existing wireless method or protocol, including, for example, via a WI-FI connection, among other wireless protocols. Thus, the access control management host 108 can, for example, be a WAN/LAN-based host that communicates with the gateway 114 via an Ethernet WAN/LAN connection. Further, the access control management host 108 can communicate through the networked gateway 114 to the access control device 102 in real time. As previously discussed, according to certain embodiments, such real time communications from the access control management host 108 to the access control devices 102 via the networked gateway 114 can include, for example, communications relating to updating an access control database (if any) in the access control device 102, inquires relating to the status(es) of the access control device(s) 102, and/or commanding a relatively immediate change in the status(es) of the access control device(s) 102. Additionally, the access control management host 108 can, in real time and via use of the networked gateway 114, push configuration and firmware updates for the system 100 and/or one or more components of the system 100, including one or more access control devices 102.

According to certain embodiments, the network connecting the gateway 114 and access control management host 108 may be dedicated for use with the security management system 100, or may be a non-dedicated network that is used in connection with operations in addition to operations and tasks associated with the security management system 100. Further, the circuitry in the various devices of the security management system 100 can be configured to provide appropriate signal conditioning to transmit and receive desired information (data) from other devices used in or by the system 100. Thus, for example, devices of the security management system 100 can include filters, amplifiers, limiters, modulators, demodulators, CODECs, digital signal processing, and/or different circuitry or functional components, among other components, that may facilitate the transmission and/or receipt of such communications.

According to the illustrated embodiment, the networked gateway 114 can establish a wireless connection with one or more of the access control devices 102 using a relatively low latency, low-power wireless technology or protocol, such as, for example WI-FI, Bluetooth (including Bluetooth low energy (BLE)), Zigbee, Near Field Communication (NFC), and/or IEEE 802.15, among other wireless technologies or protocols. The networked gateway 114 and access control devices 102 may be adapted to utilize a relatively low latency, low-power wireless technology or protocol that is generally available throughout different regions of a country(ies) and/or the world. Further, use of such relatively low latency, low-power wireless technology or protocols can at least assist in attempting to minimize the power consumption of the access control device 102 in connection with such connections. Moreover, such an approach may be used in at least an attempt to conserve the power of an energy source of the access control device 102, such as, for example, a battery of the access control device 102, while also attaining real time bi-directional communication capabilities. Further, electrical energy consumption of the access control device 102 can further be enhanced by generally limiting the length of communications to/from the access control device 102. For example, according to certain embodiments, the access control device 102 may generally engage in the sending and/or receiving information to/from the network gateway 114, and thus create a bi-directional link, for relatively short time durations, such as, for example, time durations less than or around one second, among other time durations.

The real time bi-directional communication capabilities provided by the security management system 100 of the present application provides a solution that allows access decision at the point of the access control device 102. Thus, by accommodating decisions at the access control device 102, electronic access control can still be achieved during service outage events, such as, for example, during network disruption, building power loss, and/or wireless interference, among other types of network 459. Additionally, by accommodating decisions at the access control device 102, the access control device 102 can maintain a record of events during at least an interruption in a networked connection between the access control device 102 and the networked gateway 114. Accordingly, following restoration of the networked connection between the access control device 102 and the networked gateway 114, the access control device 102 can communicate to the access control management host 108, via the gateway device 114, at least an indication of the record of events that occurred during the interruption in the networked connection.

While the invention has been described in connection with what is presently considered to be the most practical and preferred embodiment, it is to be understood that the invention is not to be limited to the disclosed embodiment(s), but on the contrary, is intended to cover various modifications and equivalent arrangements included within the spirit and scope of the appended claims, which scope is to be accorded the broadest interpretation so as to encompass all such modifications and equivalent structures as permitted under the law.

Furthermore it should be understood that while the use of the word preferable, preferably, or preferred in the description above indicates that feature so described may be more desirable, it nonetheless may not be necessary and any embodiment lacking the same may be contemplated as within the scope of the invention, that scope being defined by the claims that follow. In reading the claims it is intended that when words such as "a," "an," "at least one" and "at least a portion" are used, there is no intention to limit the claim to only one item unless specifically stated to the contrary in the claim. Further, when the language "at least a portion" and/or "a portion" is used the item may include a portion and/or the entire item unless specifically stated to the contrary.

The invention claimed is:

1. An access control device for controlling displacement of an entryway device, the access control device comprising:

at least one wireless transceiver;

a processing device structured to make a decision relating to the operation of the access control device based at least in part on information stored in the access control device; and wherein the access control device is structured to initiate communication with an access control management host in real time via a networked gateway without being prompted by the access control management host, using a low latency, low-power wireless technology or protocol, and in response to a determination that the access control device has at least one of a message, a request, or a status update for transmittal to the access control management host.

2. The access control device of claim 1, further comprising a reader device for detecting credential information of a credential device, and wherein the decision made by the processing device is based at least in part on the detected credential information and information stored in a memory of the access control device, the memory coupled to the processing device, and further wherein the access control device is powered by a battery.

3. The access control device of claim 2, wherein the memory includes a user access database, and wherein the decision is a determination of whether credentials detected by the access control device, in view of information in the user access database and the memory, indicates authority to operate the access control device.

4. The access control device of claim 3, wherein the low latency, low-power wireless technology or protocol is at least one of the following: Bluetooth (including Bluetooth low energy (BLE)) or Zigbee.

5. The access control device of claim 1, wherein the access control device is an electronic lock.

6. The access control device of claim 5, wherein the decision is a determination to displace a lock mechanism of the electronic lock from one of an unlocked position and a locked position to the other of the unlocked position and the locked position.

7. The access control device of claim 1, wherein the access control device is structured to have real time connections with the networked gateway having a duration of less than one second, during which a time the access control device transmits real time communications to the networked gateway.

8. The access control device of claim 1, wherein the access control device maintains a record of certain events during at least an interruption in a networked connection between the access control device and the networked gateway, and further wherein following restoration of the networked connection between the access control device and the networked gateway, the access control device communicates to the gateway device at least an indication of the record of events.

9. A system, comprising:

an access control device and a networked gateway, the access control device comprising:

at least one wireless transceiver;

a memory for storing information relating to operation of the access control device; and a processing device coupled to the memory, the processing device structured to make a decision relating to the operation of the access control device based at least in part on information stored in the memory; and wherein the access control device is structured to initiate communication with an access control management host in real time via the networked gateway without being prompted by the access control management host, using a low latency, low-power wireless technology or protocol, and in response to a determination that the access control device has at least one of a message, a request, or a status update for transmittal to the access control management host.

10. The system of claim 9, further comprising a reader device structured to detect credential information of a credential device, and wherein the decision made by the processing device is based at least in part on the detected credential information, and further wherein the access control device is battery powered.

11. The system of claim 10, wherein the low latency, low-power wireless technology or protocol is at least one of the following: Bluetooth (including Bluetooth low energy (BLE)) or Zigbee.

12. The system of claim 11, wherein the access control device is an electronic lock.

13. The system of claim 12, wherein the decision is a determination to displace a lock mechanism of the electronic lock from one of an unlocked position and a locked position to the other of the unlocked position and the locked position.

14. The system of claim 13, wherein the memory includes a user access database, and wherein the decision is a determination of whether credentials detected by the reader device, in view of information in the user access database and the memory, indicates authority to operate the access control device.

15. The system of claim 14, wherein the access control device is structured to have real time connections with the networked gateway having a duration of less than one second during which the access control device transmits real time communications to the networked gateway.

16. The system of claim 15, wherein the access control device maintains a record of certain events during at least an interruption in a networked connection between the access control device and the networked gateway, and further wherein following restoration of the networked connection between the access control device and the networked gateway, the access control device communicates to the networked gateway at least an indication of the record of certain events.

17. A system, comprising:

an access control device, a networked gateway, and an access control management host, the access control device comprising:

at least one wireless transceiver;

a memory for storing information relating to operation of the access control device; and a processing device coupled to the memory, the processing device structured to make a decision relating to the operation of the access control device based at least in part on information stored in the memory;

wherein the access control device is structured to initiate communication in real time with the networked gateway using a first wireless protocol without being prompted by the access control management host in response to a determination that the access control device has at least one of a message, a request, or a status update for transmittal to the access control management host, the first wireless protocol comprising a low latency, low-power wireless technology or protocol; and wherein the networked gateway communicates with the access control management host in real time using a second protocol that is different than the first wireless protocol to transmit the at least one of the message, the request, or the status update.

18. The system of claim 17, wherein the networked gateway and the access control management host communicate with each other using an Ethernet connection.

19. The system of claim 17, wherein the access control management host is structured to establish times for the access control device to seek updates.

20. The system of claim 17, wherein the second protocol is a wireless protocol, and wherein the networked gateway and the access control management host communicate with each other using at least one of a LAN, WAN, and/or cellular data network.

21. The system of claim 20, wherein the system further includes a reader device for detecting credential information of a credential device, and wherein the decision made by the processing device is based at least in part on the detected credential information, and further wherein the access control device is battery powered.

22. The system of claim 17, further comprising a mobile electronic device;

wherein the access control device is structured to transmit at least one of diagnostic results or usage data to the mobile electronic device; and wherein the mobile electronic device is structured to transmit the at least one of the diagnostic results or the usage data received from the access control device to the access control management host.

23. The system of claim 22, wherein the mobile electronic device is further structured to transmit firmware updates to the access control management host; and wherein the access control management host is further structured to push the firmware updates to the access control device.

24. The system of claim 17, wherein the access control device is an electronic lock.

25. The system of claim 24, wherein the decision is a determination to displace a lock mechanism of the electronic lock from one of an unlocked position and a locked position to the other of the unlocked position and the locked position.

26. The system of claim 25, wherein the memory includes a user access database, and wherein the decision includes a determination of whether credentials detected by the access control device, in view of information in the user access database, indicates authority to operate the access control device.

27. The system of claim 26, wherein the access control device is structured to have real time connections with the networked gateway having a duration of less than one second during which the time the access control device transmits real time communications to the networked gateway.

28. The system of claim 27, wherein the access control device maintains a record of certain events during at least an interruption in a networked connection between the access control device and the networked gateway, and further wherein following restoration of the networked connection between the access control device and the networked gateway, the access control device communicates to the networked gateway at least an indication of the record of certain events.

29. The system of claim 28, wherein a real time, bidirectional communication link is provided between the access control device and the access control management host.

30. The system of claim 25, wherein the access control management host is further structured to set parameters regarding time periods during which the lock mechanism is permitted to be displaced from the locked position to the unlocked position.

* * * * *